US008806003B2

(12) United States Patent
Brown et al.

(10) Patent No.: US 8,806,003 B2
(45) Date of Patent: Aug. 12, 2014

(54) FORECASTING CAPACITY AVAILABLE FOR PROCESSING WORKLOADS IN A NETWORKED COMPUTING ENVIRONMENT

(75) Inventors: Gene L. Brown, Durham, CT (US); Brendan F. Coffey, Rhinebeck, NY (US); Christopher J. Dawson, Arlington, VA (US); Clifford V. Harris, Saugerties, NY (US); Lynn M. Koch, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 13/159,516

(22) Filed: Jun. 14, 2011

(65) Prior Publication Data

US 2012/0324092 A1  Dec. 20, 2012

(51) Int. Cl.
  *G06F 15/16*   (2006.01)
  *G06F 15/173*   (2006.01)

(52) U.S. Cl.
  USPC .......................................... 709/224; 709/220

(58) Field of Classification Search
  CPC ... G06F 9/455; G06F 15/5022; G06F 17/509; G06Q 10/04; G06Q 10/10; G06Q 10/103; H04L 12/56; H04L 29/08306; H04L 29/08702
  USPC ....................................................... 709/224
  See application file for complete search history.

(56) References Cited

U.S. PATENT DOCUMENTS

| 6,868,441 | B2 * | 3/2005 | Greene et al. ................. 709/220 |
| 7,016,810 | B2 * | 3/2006 | Stanley .......................... 702/186 |
| 7,051,097 | B1 * | 5/2006 | Pecina .......................... 709/224 |
| 7,062,642 | B1 * | 6/2006 | Langrind et al. .................. 713/1 |
| 7,120,694 | B2 | 10/2006 | Sinha |
| 7,143,153 | B1 * | 11/2006 | Black et al. .................... 709/223 |
| 7,369,981 | B1 * | 5/2008 | Saghier et al. ................... 703/22 |
| 7,401,131 | B2 * | 7/2008 | Robertson et al. ............ 709/220 |
| 7,467,198 | B2 * | 12/2008 | Goodman et al. ............ 709/223 |
| 7,472,193 | B2 * | 12/2008 | Dauger ......................... 709/226 |
| 7,483,405 | B2 * | 1/2009 | Emond et al. ................. 370/328 |
| 7,631,069 | B2 * | 12/2009 | Bozak et al. .................. 709/224 |

(Continued)

OTHER PUBLICATIONS

Lee, G. et al., "Topology-Aware Resource Allocation for Data-Intensive Workloads", APSys 2010, Aug. 30, 2010, New Delhi, India, 5 pages.

(Continued)

*Primary Examiner* — Melvin H Pollack
(74) *Attorney, Agent, or Firm* — William E. Schiesser; Keohane & D'Alessandro, PLLC

(57) ABSTRACT

Embodiments of the present invention provide an approach for forecasting a capacity available for processing a workload in a networked computing environment (e.g., a cloud computing environment). Specifically, aspects of the present invention provide service availability for cloud subscribers by forecasting the capacity available for running or scheduled applications in a networked computing environment. In one embodiment, capacity data may be collected and analyzed in real-time from a set of cloud service providers and/or peer cloud-based systems. In order to further increase forecast accuracy, historical data and forecast output may be post-processed. Data may be post-processed in a substantially continuous manner so as to assess the accuracy of previous forecasts. By factoring in actual capacity data collected after a forecast, and taking into account applications requirements as well as other factors, substantially continuous calibration of the algorithm can occur so as to improve the accuracy of future forecasts and enable functioning in a self-learning (e.g., heuristic) mode.

25 Claims, 8 Drawing Sheets

(56) References Cited

U.S. PATENT DOCUMENTS

| | | | |
|---|---|---|---|
| 7,693,976 B2* | 4/2010 | Perry et al. | 709/223 |
| 7,761,873 B2* | 7/2010 | Hahn et al. | 718/100 |
| 8,024,396 B2* | 9/2011 | Sedukhin et al. | 709/201 |
| 8,046,767 B2* | 10/2011 | Rolia et al. | 718/104 |
| 8,112,756 B2* | 2/2012 | Cherkasova et al. | 718/104 |
| 8,219,368 B1* | 7/2012 | Akella et al. | 703/6 |
| 8,223,656 B2* | 7/2012 | Rius i Riu et al. | 370/241 |
| 8,229,761 B2* | 7/2012 | Backhaus et al. | 705/2 |
| 8,230,056 B2* | 7/2012 | Bishop et al. | 709/223 |
| 8,233,490 B2* | 7/2012 | Hundscheidt et al. | 370/395.41 |
| 8,238,253 B2* | 8/2012 | Morrill | 370/241 |
| 8,250,137 B1* | 8/2012 | Nielsen et al. | 709/203 |
| 8,270,310 B2* | 9/2012 | Raleigh | 370/252 |
| 8,280,994 B2* | 10/2012 | Blouin et al. | 709/223 |
| 8,326,976 B2* | 12/2012 | Proulx et al. | 709/224 |
| 8,452,866 B2* | 5/2013 | De Boer et al. | 709/224 |
| 8,452,876 B1* | 5/2013 | Williams et al. | 709/227 |
| 8,521,851 B1* | 8/2013 | Richardson et al. | 709/224 |
| 2002/0116485 A1* | 8/2002 | Black et al. | 709/223 |
| 2002/0174207 A1* | 11/2002 | Battou | 709/223 |
| 2002/0174227 A1* | 11/2002 | Hartsell et al. | 709/226 |
| 2003/0172145 A1* | 9/2003 | Nguyen | 709/223 |
| 2005/0071458 A1 | 3/2005 | Fisher et al. | |
| 2009/0164533 A1* | 6/2009 | Hubbard | 707/204 |
| 2010/0042720 A1 | 2/2010 | Stienhans et al. | |
| 2010/0050172 A1 | 2/2010 | Ferris | |
| 2010/0153482 A1 | 6/2010 | Kim et al. | |
| 2010/0153960 A1 | 6/2010 | Youn et al. | |
| 2010/0169477 A1 | 7/2010 | Stienhans et al. | |
| 2010/0211638 A1* | 8/2010 | Rougier | 709/205 |
| 2010/0223364 A1* | 9/2010 | Wei | 709/220 |
| 2011/0035248 A1* | 2/2011 | Juillard | 705/8 |
| 2011/0055605 A1* | 3/2011 | Jackson | 713/320 |
| 2011/0307901 A1* | 12/2011 | Blanding et al. | 718/104 |
| 2012/0096149 A1* | 4/2012 | Sunkara et al. | 709/224 |
| 2012/0127511 A1* | 5/2012 | Evanitsky | 358/1.15 |
| 2012/0131176 A1* | 5/2012 | Ferris et al. | 709/224 |
| 2012/0136971 A1* | 5/2012 | Cherkasova et al. | 709/219 |
| 2012/0140620 A1* | 6/2012 | Hogan et al. | 370/230 |
| 2012/0144008 A1* | 6/2012 | Yuyitung et al. | 709/223 |
| 2012/0166617 A1* | 6/2012 | Chang et al. | 709/224 |
| 2012/0233328 A1* | 9/2012 | Iyoob et al. | 709/226 |
| 2012/0303800 A1* | 11/2012 | Maldaner | 709/224 |
| 2012/0324091 A9* | 12/2012 | Raleigh et al. | 709/224 |
| 2013/0046887 A1* | 2/2013 | Malloy et al. | 709/224 |

OTHER PUBLICATIONS

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

* cited by examiner

FORECASTING CAPACITY AVAILABLE FOR PROCESSING WORKLOADS IN A NETWORKED COMPUTING ENVIRONMENT

TECHNICAL FIELD

In general, embodiments of the present invention relate to available capacity forecasting. Specifically, embodiments of the present invention relate to the forecasting of available resource capacity for processing workloads in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Challenges can exist in computing environments such as cloud computing environments when attempting to forecast an available capacity of a system to process workload. For example, cloud consumers and cloud providers may engage in agreements such as service level agreements (SLAs) that specify the terms by which one or more services will be provided. It is typical for SLAs to designate a certain level of service (e.g., workload capacity, time table for processing workloads, etc.) that will be provided to the consumer. However, given the dynamic nature of such computing environments, forecasting future capacities to ensure SLA compliance remains a challenge.

SUMMARY

In general, embodiments of the present invention provide an approach for forecasting a capacity available for processing a workload in a networked computing environment (e.g., a cloud computing environment). Specifically, aspects of the present invention provide service availability for cloud subscribers by forecasting the capacity available for running or scheduled applications in a networked computing environment. In one embodiment, capacity data may be collected and analyzed in real-time from a set of cloud service providers and/or peer cloud-based systems. In order to further increase forecast accuracy, historical data and forecast output may be post-processed. Data may be post-processed in a substantially continuous manner so as to assess the accuracy of previous forecasts. By factoring in actual capacity data collected after a forecast, and taking into account applications requirements as well as other factors, substantially continuous calibration of the algorithm can occur so as to improve the accuracy of future forecasts and enable functioning in a self-learning (e.g., heuristic) mode.

A first aspect of the present invention provides a computer-implemented method for forecasting an available capacity for processing a workload in a networked computing environment, comprising: receiving and storing, in a computer data structure, capacity data corresponding to a set of peer systems in the networked computing environment; accessing historical data related to workload handling for each of the set of peer systems; forecasting the available capacity of the set of peer systems to process the workload based on the capacity data and the historical data; determining a consistency factor for each of the set of peer systems to prioritize the set of peer systems for processing the workload based on the historical data; and prioritizing the set of peer systems for processing the workload based on the capacity and the consistency factor.

A second aspect of the present invention provides a system for forecasting an available capacity for processing a workload in a networked computing environment, comprising: a bus; a processor coupled to the bus; and a memory medium coupled to the bus, the memory medium comprising instructions to: receive and store, in a computer data structure, capacity data corresponding to a set of peer systems in the networked computing environment; access historical data related to workload handling for each of the set of peer systems; forecast the available capacity of the set of peer systems to process the workload based on the capacity data and the historical data; determine a consistency factor for each of the set of peer systems to prioritize the set of peer systems for processing the workload based on the historical data; and prioritize the set of peer systems for processing the workload based on the capacity and the consistency factor.

A third aspect of the present invention a computer program product for forecasting an available capacity for processing a workload in a networked computing environment, the computer program product comprising a computer readable storage media, and program instructions stored on the computer readable storage media, to: receive and store, in a computer data structure, capacity data corresponding to a set of peer systems in the networked computing environment; access historical data related to workload handling for each of the set of peer systems; forecast the available capacity of the set of peer systems to process the workload based on the capacity data and the historical data; determine a consistency factor for each of the set of peer systems to prioritize the set of peer systems for processing the workload based on the historical data; and prioritize the set of peer systems for processing the workload based on the capacity and the consistency factor.

A fourth aspect of the present invention a method for deploying a computer infrastructure for forecasting an available capacity for processing a workload in a networked computing environment, comprising: providing a computer infrastructure being operable to: receive and store, in a computer data structure, capacity data corresponding to a set of peer systems in the networked computing environment; access historical data related to workload handling for each of the set of peer systems; forecast the available capacity of the set of peer systems to process the workload based on the capacity data and the historical data; determine a consistency factor for each of the set of peer systems to prioritize the set of peer systems for processing the workload based on the historical data; and prioritize the set of peer systems for processing the workload based on the capacity and the consistency factor.

BRIEF DESCRIPTION OF THE DRAWINGS

These and other features of this invention will be more readily understood from the following detailed description of the various aspects of the invention taken in conjunction with the accompanying drawings in which.

Figure 1:
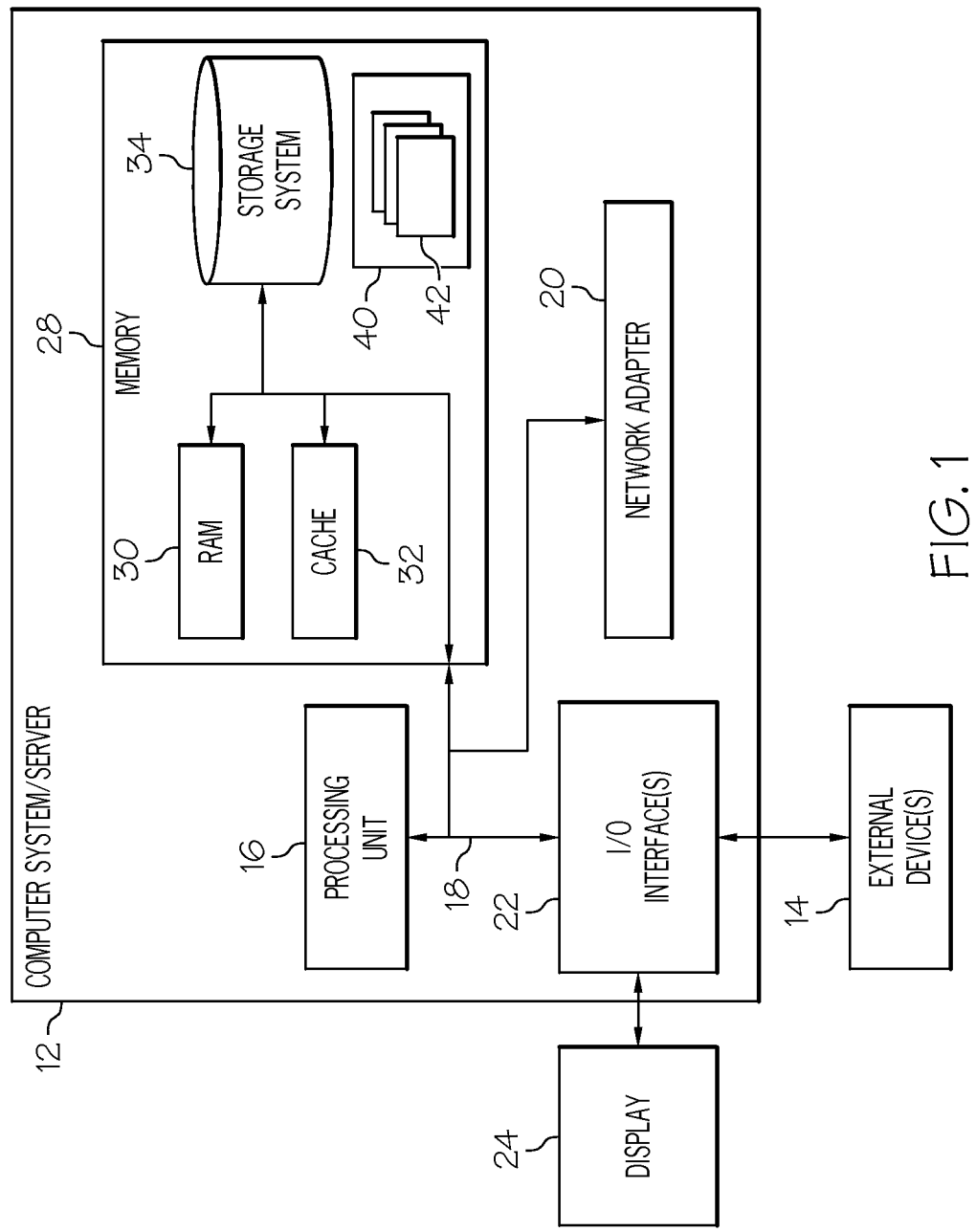
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for forecasting a capacity available for processing a workload in a networked computing environment (e.g., a cloud computing environment). Specifically, aspects of the present invention provide service availability for cloud subscribers by forecasting the capacity available for running or scheduled applications in a networked computing environment. In one embodiment, capacity data may be collected and analyzed in real-time from a set of cloud service providers and/or peer cloud-based systems. In order to further increase forecast accuracy, historical data and forecast output may be post-processed. Data may be post-processed in a substantially continuous manner so as to assess the accuracy of previous forecasts. By factoring in actual capacity data collected after a forecast, and taking into account applications requirements as well as other factors, substantially continuous calibration of the algorithm can occur so as to improve the accuracy of future forecasts and enable functioning in a self-learning (e.g., heuristic) mode.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
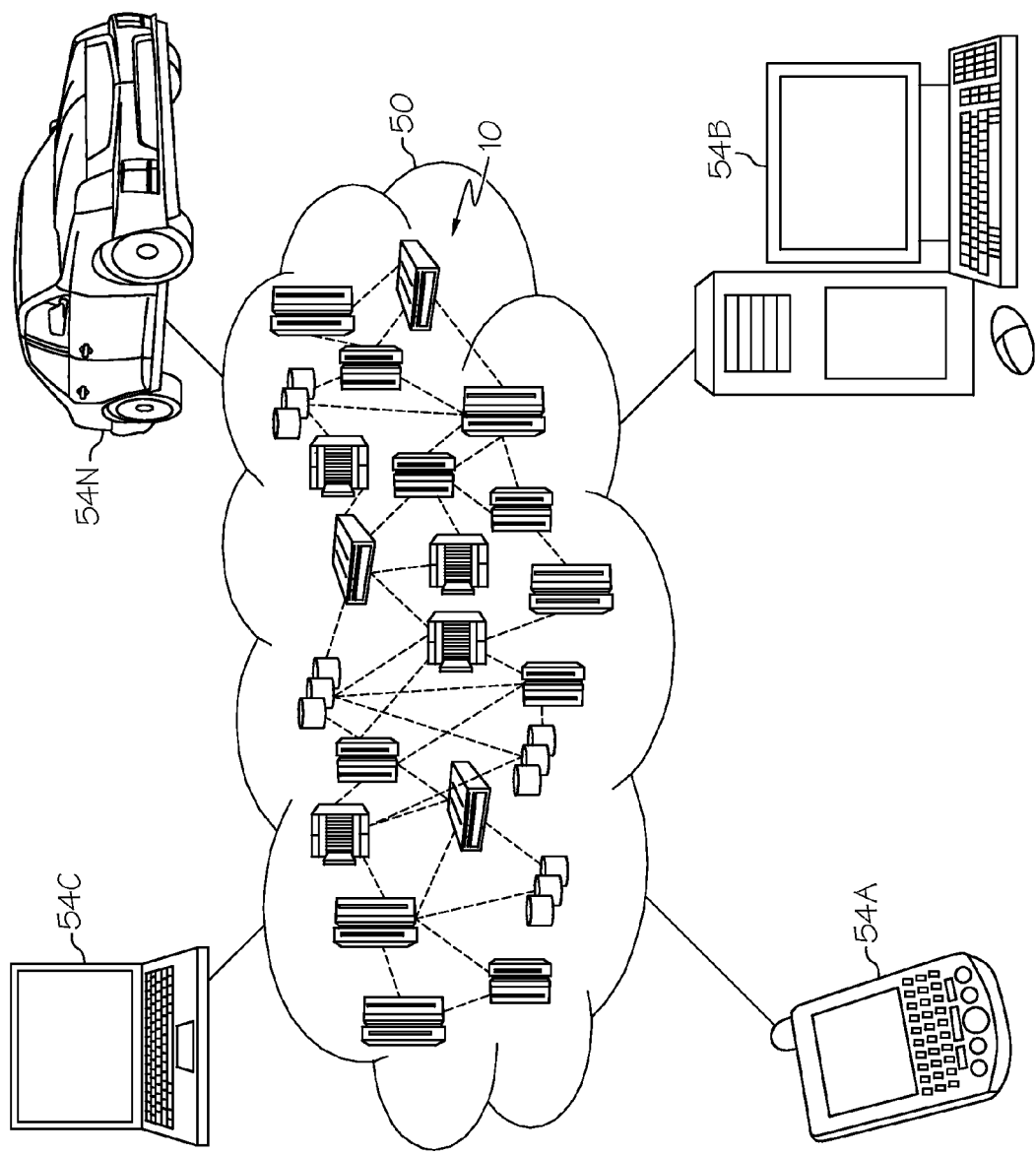
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
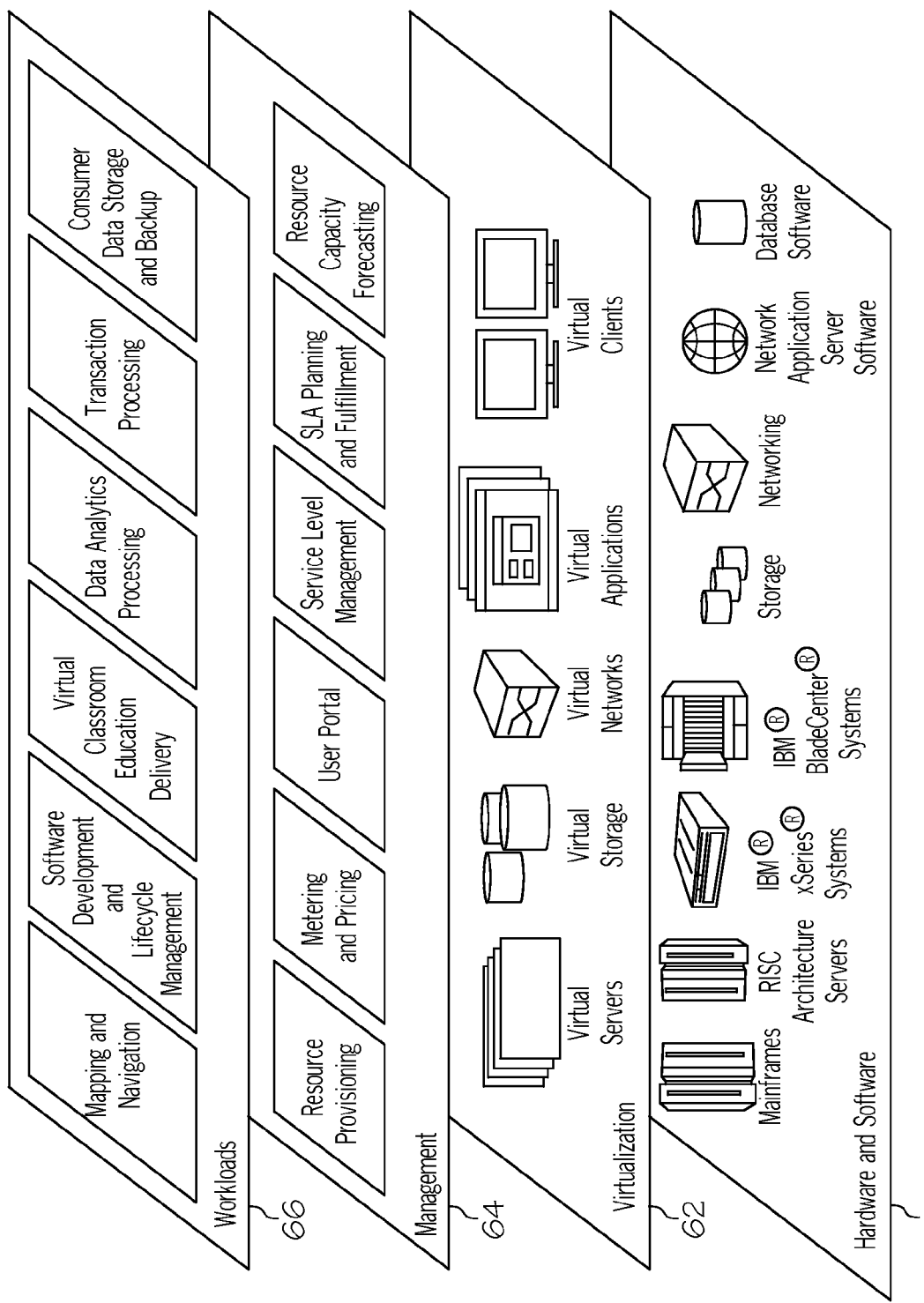
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is resource capacity forecasting, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the resource capacity forecasting functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Embodiments of the invention provide an approach for information technology (IT) cloud resource forecasting that will detect resource imbalances and dynamically remediate such imbalances by provisioning capacity in partner/peer clouds to ensure uninterrupted service. Subscribers typically enter into IT cloud service contracts (e.g., service level agreements (SLAs)) with an expectation that cloud providers have the capability to forecast capacity requirements and dynamically allocate resources to meet predefined service levels. Consumers/subscribers may request that cloud services be maintained at a certain level, and may further request continuously available cloud services to support their applications. Therefore, cloud service providers could benefit from a system that controls the computing environment in such a way that the system can identify and forecast potential failure scenarios. This can be used to maintain service levels when a user moves from one location to the next or as a way of ensuring sufficient capacity to meet all processing requests.

The forecasting of available IT cloud resources is particularly important because cloud providers cannot assume that their consumers have a complete understanding of their capacity requirements. Consumers may not have visibility to other workloads in a shared cloud service and therefore may assume that the cloud manages the inherent elasticity provided in a cloud environment. While service-oriented architectures (SOAs) and web services deliver consistent and repeatable services, the complexity of the underlying cloud service could be more challenging because it needs to be transparent, dynamic and application independent.

To facilitate dynamic expansion of resources, cloud providers can establish peer relationships to provision additional resources using excess capacity from partner/peer clouds. Software can be provided to integrate the resources from multiple providers by calling application programming interfaces (APIs) published by cloud providers. This approach may complement and extend existing provider capabilities through proactive forecasting of resource consumption, detection of available capacity, and automatically balancing workload across providers.

Among other things, embodiments of the present invention provide the capability to detect cloud resource capacity, perform real-time analysis and provide for continuous learning to accurately forecast resource capacity and availability for use by cloud services through peer relationships. This solution will help to ensure cloud providers can: meet their committed service levels, offer continuously available services from the cloud, and integrate this approach with other cloud management solutions to form more robust reliable service offerings.

The concept provided by the embodiments of the present invention is the ability to ensure service availability for cloud subscribers by forecasting the capacity available for running or scheduled applications in the cloud. Along these lines, data such as capacity data may be collected and analyzed in real-time from contributing cloud providers. To continually increase the odds that the forecasting is accurate, historical data and forecasting output will be post-processed. The system may continuously post-process data in order to grade the accuracy of its prior forecasting operations. By factoring in actual capacity data collected after a forecasting, taking into account application requirements and other factors, the system can continuously calibrate the algorithm to improve accuracy and become self-learning (e.g., heuristic).

Figure 4:
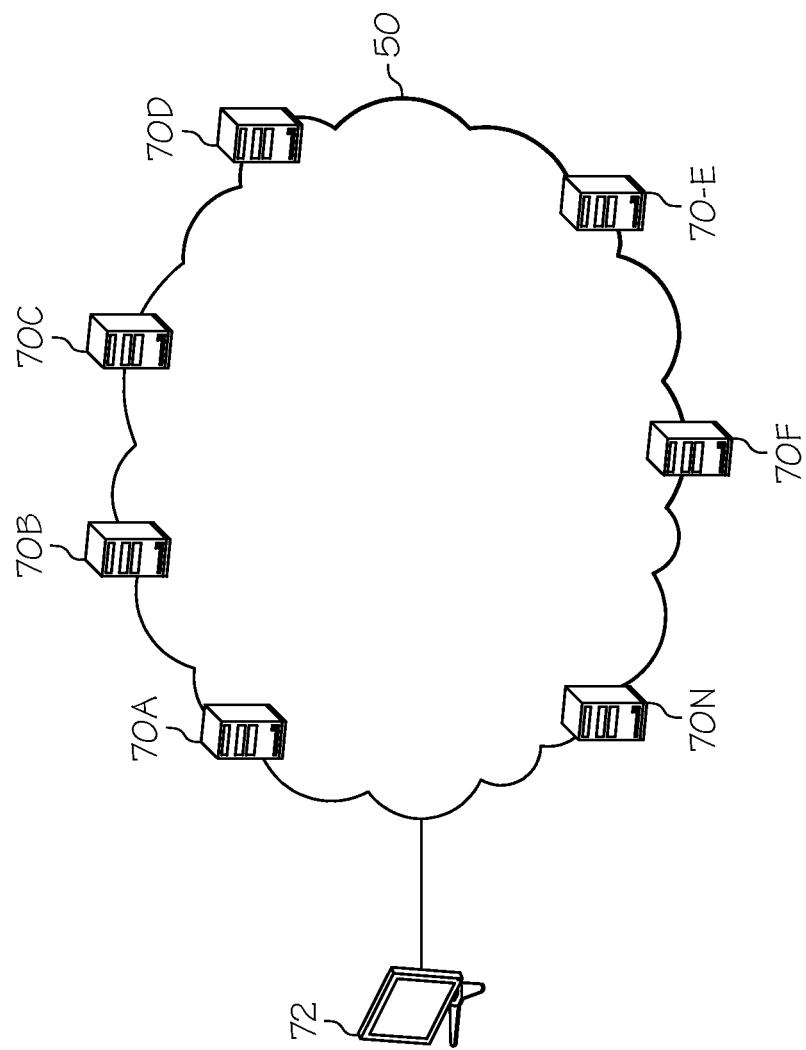
FIG. 4 depicts a set of peer systems in a cloud computing environment according to an embodiment of the present invention.

Referring now to FIG. 4, a peer group is shown. As depicted, cloud computing environment 50 (such as that depicted in FIG. 2) is shown in which a set (at least one) of provider/peer systems 70A-D communicate with one another. As further shown, an available capacity forecasting system (system 72) is provided to enable the functionality discussed herein. Along these lines, system 72 can comprise cloud computing node 10 of FIGS. 1-2, and/or function as another peer system in set of peer systems 70A-N. Regardless, to further enhance the heuristic quality of system 72, the system 72 will maintain a data record for each peer system 70A-N by capacity type (e.g., storage and computing) and will calculate and establish a consistency factor for each peer system 70A-N. The consistency factor will be applied to prioritize each peer system 70A-N among other another for optimal selection for processing a workload from a consumer. Peer systems 70A-N with highest consistency factors will receive more workload processing requests. Therefore, there may be an economic incentive for peer systems 70A-N to reserve some capacity for spill-over processing from other clouds.

A further tier of refinement is categorization by application type (e.g., electronic mail (email), consumer relationship management (CRM), enterprise resource planning (ERP) etc.). By introducing application types, the prioritization and grading and subsequent selection of providers can be improved to align work load types with those environments which have historically demonstrated, through metrics, the greatest forecastability.

Illustrative Example

Figure 5:
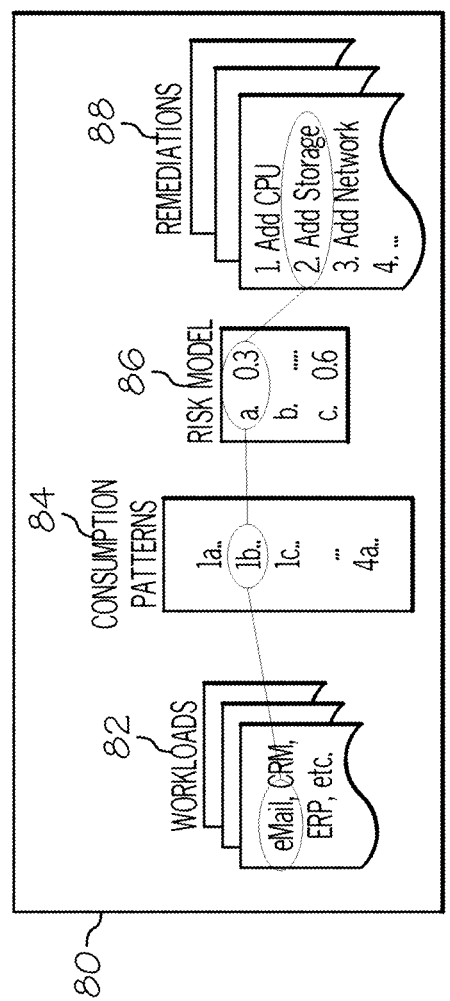
FIG. 5 depicts an illustrative example according to an embodiment of the present invention.

Referring to FIG. 5, an illustrative example/scenario 80 is depicted. In this example, assume that a consumer is using a cloud to provide specific resources in support of a given workloads 82. Further assume workloads 82 is network-based email. Historical data has been captured by the system such that various consumption patterns 84 have been identified per workloads 82. A risk model (ranking) 86 is available to determine the probability of each consumption pattern 84 where a risk rating indicates the likelihood that a consumption pattern 84 may exceed its associated resources. Remediations 88 represents actions derived from an analytic model that assesses a workload's risk rating. The need for remediation 88 may be due to the oversubscribing of cloud resources or network congestion.

Figure 6:
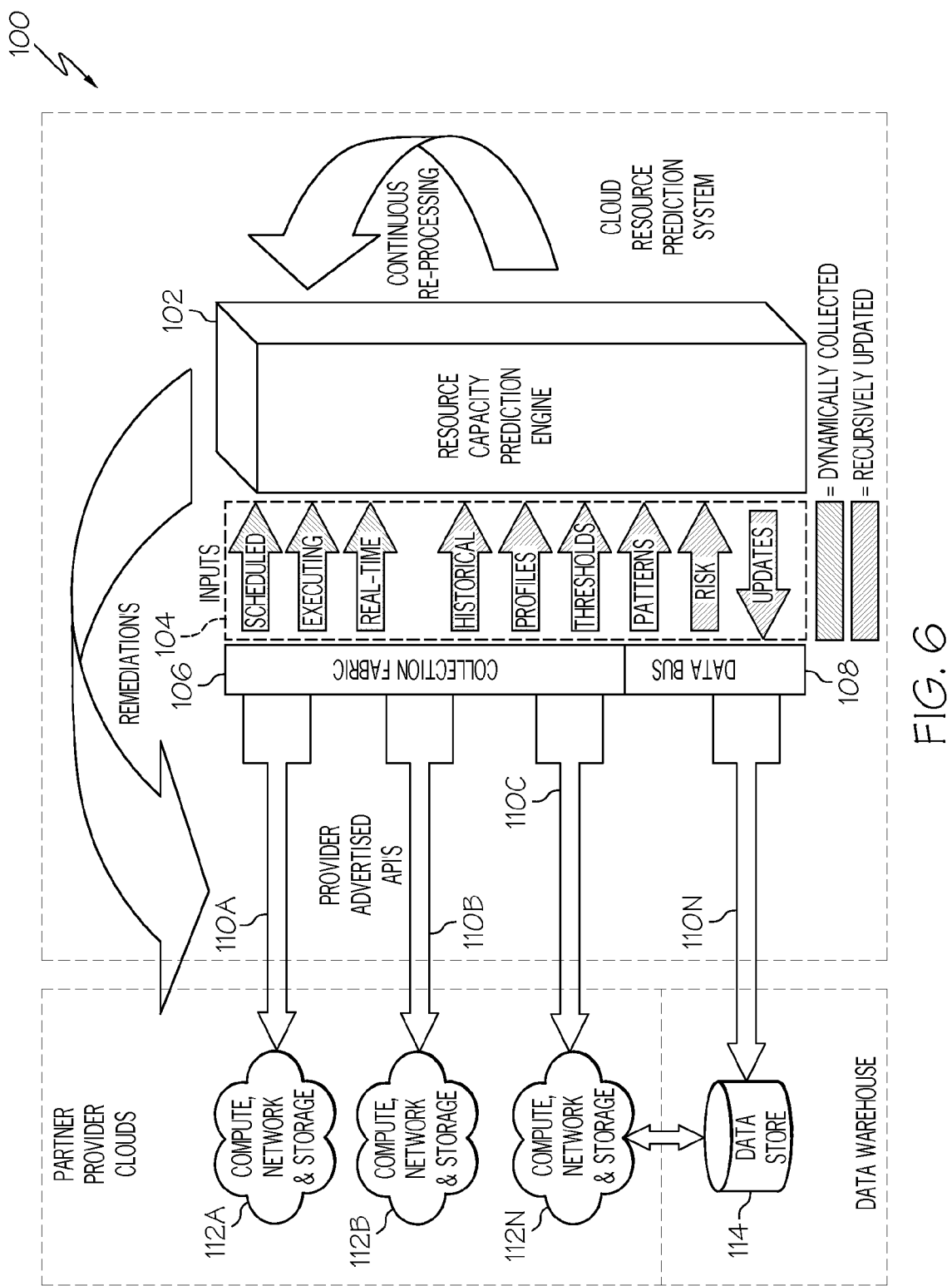
FIG. 6 depicts a system diagram according to an embodiment of the present invention.

Referring to FIG. 6, a system diagram 100 that provides the above-described and other functionality is shown in greater detail. In general, the system utilizes data from partner/peer cloud service providers to forecast capacity requirements and dynamically allocate resources to meet predefined service levels. As shown, system 100 comprises a resource capacity planning engine (engine 102) that receives/collects and processes various types of input data 104 from peer systems 112A-N (e.g., partner provider clouds). It is understood that engine 102 can comprise program utility 40 of FIG. 1 to carry out the functions recited herein (e.g., as depicted by resource capacity forecasting function in management layer 64 of FIG. 3). As such, engine 102 can be implemented via a computer infrastructure such as cloud computing node 10 of FIG. 1 and/or forecasting system 72 of FIG. 4. Regardless, communication and data exchange between set of peer systems 112A-N and engine 102 occurs via collection fabric 106, data bus 108, and APIs 110A-N. As further shown, set of peer systems 112A-N can communicate with a data store/data warehouse 114 or the like.

More specifically, engine 102 receives/collects input data collected from set of peer systems 112A-N using open source, standard, or proprietary API calls to create an abstract logical component model of each cloud provider's infrastructure. Additional data is incrementally layered with the component model to establish generic patterns for processing ensembles. Each component of an ensemble has mandatory and optional attributes which are used by a ranking algorithm to establish a component's priority for assignment during remediation. In a typical embodiment, the input data collected or derived comprises at least one of the following:

Batch applications scheduled to run on a one-time or recurring basis (dynamically collected);

Executing applications, batch, application servers, web applications and infrastructure services (dynamically collected);

Component level real-time capacity data, free and in use for compute, storage, and network (dynamically collected);

Component level historical capacity data, 5, 15, 30 & 60 minute, prime time by zone, 24 hour and 30-day averages (recursively updated);

Workloads, detailed application profiles consisting of components utilized, capacity planning data, service level commitments and historic resource utilization (recursively updated);

Thresholds established for components which define ensembles or processing pattern (recursively updated);

Consumption patterns derived from historic component utilization and application data (recursively updated); and/or Risk models based on analysis of historic workloads and consumption patterns (recursively updated).

Engine 70 pro-actively detects resource constraints through real-time data collection and analysis, coupled with continuous post processing of historical data to identify consumption patterns and improve forecasting accuracy.

Figure 7:
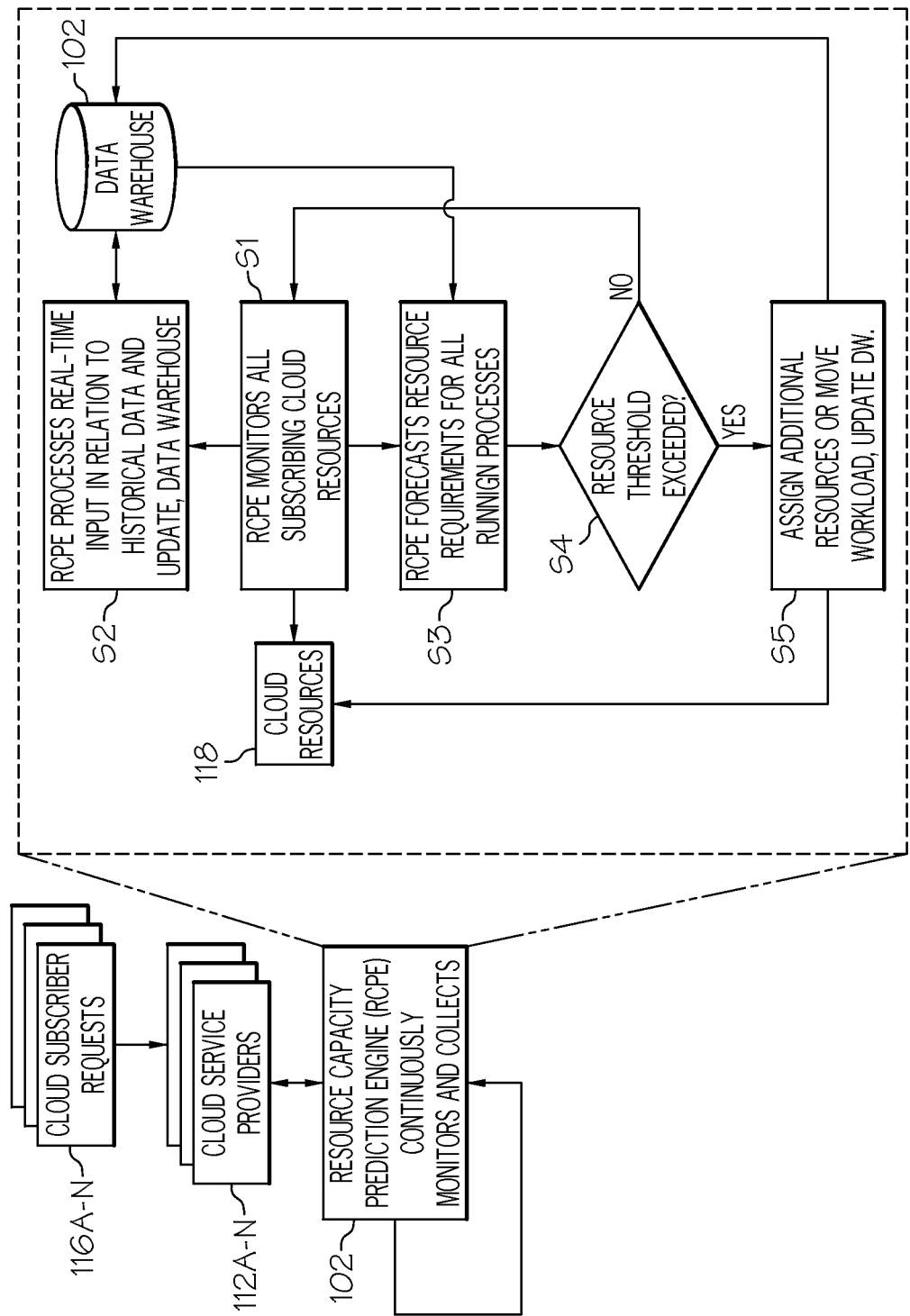
FIG. 7 depicts a process flow diagram according to an embodiment of the present invention.

Referring to FIG. 7, a process flow diagram demonstrating the continuous data processing function based on the system diagram of FIG. 6 is shown. As shown, engine 102 communicates with set of peer systems/cloud service providers 112A-N, which receive cloud subscriber/consumer requests 116A-N (e.g., associated with one or more workloads). The process performed by engine 102 is separated out in FIG. 7. As depicted, in step S1, engine 102 monitors cloud resources 118. In step S2, engine 102 processes input data (such as that set forth above) received (e.g., received in real time) and updates data warehouse 114. In step S3, engine 102 forecasts resource requirements for running processes. In step S4, engine 102 determines whether a resource threshold/capacity (e.g., as forecasted by engine 70 will be further described in conjunction with FIG. 8) is exceeded. If not, the process returns to step S1. If capacity is exceeded, additional resources are assigned to process the workload or the workload is moved to another system in step S5. In either event, data warehouse 114 can be updated.

Figure 8:
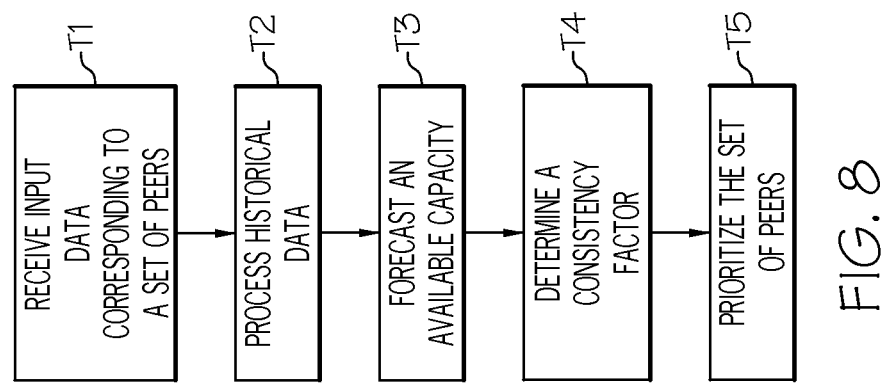
FIG. 8 depicts a method flow diagram according to an embodiment of the present invention.

Referring now to FIG. 8, a method flow diagram according to an embodiment of the present invention is shown. It is understood that these steps are typically performed by engine 102. As shown in step T1, input data (e.g., capacity data, etc.) corresponding to a set of peer systems in the networked computing environment is received and stored in a computer data structure (e.g., memory 28 of FIG. 1). As indicated above, the input data can comprise at least one of the following: batch application data, executing application data, component level capacity data, application profiles, workload data, component threshold data, consumption pattern data, or risk model data. In step T2, historical data related to workload handling is accessed for each of the set of peer systems. In step T3, an available capacity of the set of peer systems to process the workload is forecasted based on the capacity data and the historical data. In step T4, a consistency factor is determined for each of the set of peer systems to prioritize the set of peer systems for processing the workload based on the historical data. In general, the consistency factor indicates a historical level of consistency with which each of the set of peer systems has successfully processed workloads. In step T5, the set of peer systems is prioritized for processing the workload based on the capacity and the consistency factor. Ranking and priority is dynamically adjusted based on continuous re-processing of historic and real-time data.

Although not shown, engine 102 can further compare the capacity to a predefined service level (e.g., such as in a SLA or the like), determine if the predefined service level has been met, and reallocate at least one resource in the networked responsive to the predefined service level not being met. In addition, engine 70 can reprioritize the set of peer systems based on at least one of the following: updated capacity data, updated historical data, or an updated consistency factor.

While shown and described herein as a resource capacity forecasting solution, it is understood that the invention further provides various alternative embodiments. For example, in one embodiment, the invention provides a computer-readable/useable medium that includes computer program code to enable a computer infrastructure to provide resource capacity forecasting functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide resource capacity forecasting functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for resource capacity forecasting. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for forecasting an available capacity for processing a workload in a networked computing environment, comprising:
    receiving and storing, in a computer data structure, capacity data corresponding to a set of peer systems in the networked computing environment;
    accessing historical data for each of the set of peer systems, the historical data comprising information as to how the each of the set of peer systems handles workloads;
    forecasting the available capacity of the set of peer systems to process the workload based on the capacity data and the historical data;
    determining a set of consistency factors for each of the set of peer systems to prioritize the set of peer systems for processing the workload based on the historical data, each the set of consistency factors comprising a level of consistency with which at least one of the set of peer systems has historically processed workloads of an application type corresponding to the application type of the workload; and
    prioritizing the set of peer systems for processing the workload based on the capacity and the set of consistency factors.

2. The computer-implemented method of claim 1, the networked computing environment comprising a cloud computing environment, and the set of peer systems comprising a set of cloud systems.

3. The computer-implemented method of claim 1, further comprising creating a data record based on the historical data, the data record being arranged according to a type of capacity for each of the peer systems based on the historical data, and the forecasting being further based on the data record.

4. The computer-implemented method of claim 1, further comprising:
    comparing the capacity to a predefined service level;
    determining if the predefined service level has been met; and
    reallocating at least one resource in the networked computing environment responsive to the predefined service level not being met.

5. The computer-implemented method of claim 4, the predefined service level being derived from a service level agreement (SLA).

6. The computer-implemented method of claim 1, the receiving further comprising receiving input data comprising at least one of the following: batch application data, executing application data, component level capacity data, application profiles, workload data, component threshold data, consumption pattern data, or risk model data.

7. The computer-implemented method of claim 1, the set of consistency factors indicating a historical level of consistency with which each of the set of peer systems has successfully processed workloads.

8. The computer-implemented method of claim 1, further comprising reprioritizing the set of peer systems based on at least one of the following: updated capacity data, updated historical data, or an updated consistency factor.

9. A system for forecasting an available capacity for processing a workload in a networked computing environment, comprising:
    a bus;
    a processor coupled to the bus; and
    a memory medium coupled to the bus, the memory medium comprising instructions to:
        receive and store, in a computer data structure, capacity data corresponding to a set of peer systems in the networked computing environment;
        access historical data for each of the set of peer systems, the historical data comprising information as to how the each of the set of peer systems handles workloads;
        create a historical record according a type of capacity for each of the peer systems based on the historical data;
        determine a set of consistency factors for each of the set of peer systems to prioritize the set of peer systems for processing the workload based on the historical data, each the set of consistency factors comprising a level of consistency with which at least one of the set of peer systems has historically processed workloads of an application type corresponding to the application type of the workload; and
        prioritize the set of peer systems for processing the workload based on the capacity and the set of consistency factors.

10. The system of claim 9, the networked computing environment comprising a cloud computing environment, and the set of peer systems comprising a set of cloud systems.

11. The system of claim 9, the memory medium further comprising instructions to create a data record based on the historical data, the data record being arranged according to a type of capacity for each of the peer systems based on the historical data, and the forecasting being further based on the data record.

12. The system of claim 9, the memory medium further comprising instructions to:
    compare the capacity to a predefined service level;
    determine if the predefined service level has been met; and
    reallocate at least one resource in the networked computing environment responsive to the predefined service level not being met.

13. The system of claim 12, the predefined service level being derived from a service level agreement (SLA).

14. The system of claim 9, the memory medium further comprising instructions to receive input data comprising at least one of the following: batch application data, executing application data, component level capacity data, application profiles, workload data, component threshold data, consumption pattern data, or risk model data.

15. The system of claim 9, the set of consistency factors indicating a historical level of consistency with which each of the set of peer systems has successfully processed workloads.

16. The system of claim 9, the memory medium further comprising instructions to reprioritize the set of peer systems based on at least one of the following: updated capacity data, updated historical data, or an updated consistency factor.

17. A computer program product for forecasting an available capacity for processing a workload in a networked computing environment, the computer program product comprising a computer readable storage media, and program instructions stored on the computer readable storage media, to:

receive and store, in a computer data structure, capacity data corresponding to a set of peer systems in the networked computing environment;

access historical data for each of the set of peer systems, the historical data comprising information as to how the each of the set of peer systems handles workloads;

create a historical record according a type of capacity for each of the peer systems based on the historical data;

determine a set of consistency factors for each of the set of peer systems to prioritize the set of peer systems for processing the workload based on the historical data, each the set of consistency factors comprising a level of consistency with which at least one of the set of peer systems has historically processed workloads of an application type corresponding to the application type of the workload; and prioritize the set of peer systems for processing the workload based on the capacity and the set of consistency factors.

18. The computer program product of claim 17, the networked computing environment comprising a cloud computing environment, and the set of peer systems comprising a set of cloud systems.

19. The computer program product of claim 17, the computer readable storage media further comprising instructions to create a data record based on the historical data, the data record being arranged according to a type of capacity for each of the peer systems based on the historical data, and the forecasting being further based on the data record.

20. The computer program product of claim 17, the computer readable storage media further comprising instructions to:

compare the capacity to a predefined service level;

determine if the predefined service level has been met; and reallocate at least one resource in the networked computing environment responsive to the predefined service level not being met.

21. The computer program product of claim 20, the predefined service level being derived from a service level agreement (SLA).

22. The computer program product of claim 17, the computer readable storage media further comprising instructions to receive input data comprising at least one of the following: batch application data, executing application data, component level capacity data, application profiles, workload data, component threshold data, consumption pattern data, or risk model data.

23. The computer program product of claim 17, the set of consistency factors indicating a historical level of consistency with which each of the set of peer systems has successfully processed workloads.

24. The computer program product of claim 17, the computer readable storage media further comprising instructions to reprioritize the set of peer systems based on at least one of the following: updated capacity data, updated historical data, or an updated consistency factor.

25. A method for deploying a computer infrastructure for forecasting an available capacity for processing a workload in a networked computing environment, comprising:

providing a computer infrastructure being operable to:

receive and store, in a computer data structure, capacity data corresponding to a set of peer systems in the networked computing environment;

access historical data for each of the set of peer systems, the historical data comprising information as to how the each of the set of peer systems handles workloads;

forecast the available capacity of the set of peer systems to process the workload based on the capacity data and the historical data;

determine a set of consistency factors for each of the set of peer systems to prioritize the set of peer systems for processing the workload based on the historical data, each the set of consistency factors comprising a level of consistency with which at least one of the set of peer systems has historically processed workloads of an application type corresponding to the application type of the workload; and prioritize the set of peer systems for processing the workload based on the capacity and the set of consistency factors.

\* \* \* \* \*